Patented Oct. 24, 1939

2,177,355

UNITED STATES PATENT OFFICE 2,177,355

7-KETO CHOLESTERYL HALIDE AND PROCESS OF MAKING IT

Russell Earl Marker, State College, Pa., assignor to Parke, Davis & Company, Detroit, Mich., a corporation of Michigan No Drawing. Application March 12, 1937, Serial No. 130,583

6 Claims. (Cl. 260—397)

The invention relates to the preparation of new sterol derivatives. It is concerned more particularly with a new method for the preparation of epi-cholesterol from cholesteryl halides and with preparation of the intermediate 7-keto cholesterol derivatives used in the process.

It has now been found that a cholesteryl halide, such as cholesteryl chloride, can be converted to epi-cholesterol by oxidizing the halide to the corresponding 7-keto cholesteryl halide, epimerizing the latter at the 3-carbon-atom to give a 7-keto epi-cholesterol compound which is separated from the water-insoluble non-alcoholic reaction products of the epimerization reaction by converting the 7-keto epi-cholesterol compound to its water-soluble mono-ester salt of a dibasic organic acid, separating the latter compound in aqueous solution and hydrolyzing to obtain purified 7-keto epi-cholesterol which is converted by a ketone reagent, such as semicarbazide, to a hydrazine derivative and the hydrazine derivative reduced by the action of hot alkali alcoholate into epi-cholesterol.

It has further been found that when a 7-keto cholesteryl halide, such as the chloride, is reacted with fused potassium acetate in valeric acid, 7-keto cholesterylene is produced along with 7-keto epi-cholesterol acetate.

In addition to the new compounds, 7-keto cholesteryl halides, 7-keto cholesterylene, and 7-keto epi-cholesterol, several new 7-keto derivatives of the latter compound are also prepared as intermediates in the present process for making epi-cholesterol.

In carrying out the process of making epi-cholesterol from a halide, such as cholesteryl chloride, the latter compound is oxidized, preferably with chromic oxide, to produce 7-keto cholesteryl chloride which is then treated with the fused alkali salt of an organic acid, e. g. fused potassium acetate in valeric acid. The fused alkali metal salt produces the 3-acylated derivative of 7-keto epi-cholesterol and also eliminates HCl from the 7-keto cholesteryl chloride to produce 7-keto cholesterylene. In order to separate the 7-keto epi-cholesterol acetate from the 7-keto cholesterylene, the mixture is hydrolyzed to convert the acylated compound into 7-keto epi-cholesterol. The latter can then be removed from the water-insoluble 7-keto cholesterylene by acylating the hydrolysis mixture with an acylating agent derived from a dibasic organic acid, e. g. succinic acid anhydride, to produce the 7-keto epi-cholesterol mono-ester of the acid, and separating this mono-ester from 7-keto cholesterylene by dissolving it in aqueous alkali solution. The separated mono-ester is then saponified to give purified 7-keto epi-cholesterol.

The 7-keto epi-cholesterol is converted to epi-cholesterol by any of the known methods for reduction of a keto group without simultaneous reduction of an unsaturated carbon-carbon double-bond. The preferred method in the present process is to react the 7-keto epi-cholesterol with a hydrazine derivative, especially semicarbazide, to produce the semicarbazone of 7-keto epi-cholesterol, which is then reduced by heating with alkali metal alcoholate to give epi-cholesterol.

The following examples, including the experimental details, will serve to illustrate the invention.

*7-keto-cholesteryl chloride from cholesteryl chloride.*—To a solution of 203 g. of cholesteryl chloride in 3500 cc. of acetic acid kept at 55° is added over a one-hour period a solution of 150 g. of chromic oxide in 100 cc. of water and 100 cc. of glacial acetic acid. The solution is stirred during an additional two hours. Ethyl alcohol is added and the reaction mixture concentrated under reduced pressure at 55° to a volume of 1.5 liters. To this is added 100 cc. of water and the mixture is cooled over night. The crystalline material is filtered, washed with 600 cc. of alcohol followed by 300 cc. of acetone and is finally crystallized from acetone. The 7-keto-cholesteryl chloride thus obtained has a melting-point of 145°. Yield 50 g. The melting-point of the semicarbazone is 176°.

Analysis calculated for $C_{27}H_{43}OCl$: C, 77.4; H, 10.3. Found: C, 77.8; H, 10.2.

Analysis calculated for $C_{28}H_{46}OClN_3$: C, 70.7; H, 9.7. Found: C, 70.5; H, 10.0.

*Epi-cholesterol from 7-keto-cholesteryl chloride.*—To a solution of 5 g. of 7-keto-cholesteryl chloride in 25 cc. of valeric acid there is added 7 g. of fused potassium acetate and the mixture is refluxed for 14 hours. The reaction mixture is extracted with ether, and the ether solution washed with sodium carbonate solution. The acetate obtained after evaporation of the ether is hydrolyzed by means of alcoholic potassium hydroxide. The oily material resulting is dried and treated with 2 g. of succinic anhydride in 15 cc. of pyridine, being heated 4 hours on the steam bath. The reaction product is dissolved in ether and washed free of pyridine with hydrochloric acid. The succinate is then removed from ether by washing with sodium carbonate solution, the resulting solution being again washed with ether. The ether solutions are worked up later by evaporation and taking up the residue in organic solvents and recrystallizing to give 7-keto-cholesterylene melting at 114° C. The alkaline solution is acidified and extracted with ether to remove the succinate which is then hydrolyzed by boiling with alcoholic potassium hydroxide. The resulting product is then converted to the semicarbazone by heating with alcoholic semicarbazide acetate. This crude product is added directly to 10 cc. of absolute alcohol and to this is added a solution of 0.2 g. of sodium in 10 cc. of absolute alcohol. This is heated at 170–180° for 6 hours after which water is added and the product extracted with ether. The product is then sublimed at 140°. using a mercury vapor pump and the sublimate crystallized from alcohol, m. 141°. Mixed with cholesterol (m. 147°) it gives a depression in melting point of 9°. Mixed with known epi-cholesterol it gives no depression.

Analysis calculated for $C_{27}H_{46}O$: C, 83.9; H, 12.0. Found: C, 84.0; H, 11.8.

*7-keto-cholesterylene.*—To 1 g. of 7-keto-cholesteryl chloride dissolved in 30 cc. of alcohol there is added 1.5 g. of potassium hydroxide in 2 cc. of water. The product is refluxed 2 hours. Water is added and the product extracted with ether. It is crystallized from alcohol, m. 114°.

Analysis calculated for $C_{27}H_{42}O$: C, 84.8; H, 10.9. Found: C, 84.4; H, 10.8.

The same product is obtained as a by-product in the preparation of epi-cholesterol from 7-keto-cholesteryl chloride, as already described above.

To further illustrate the invention, the following diagrammatic representation of the reactions of the above examples, with formulas, is given.

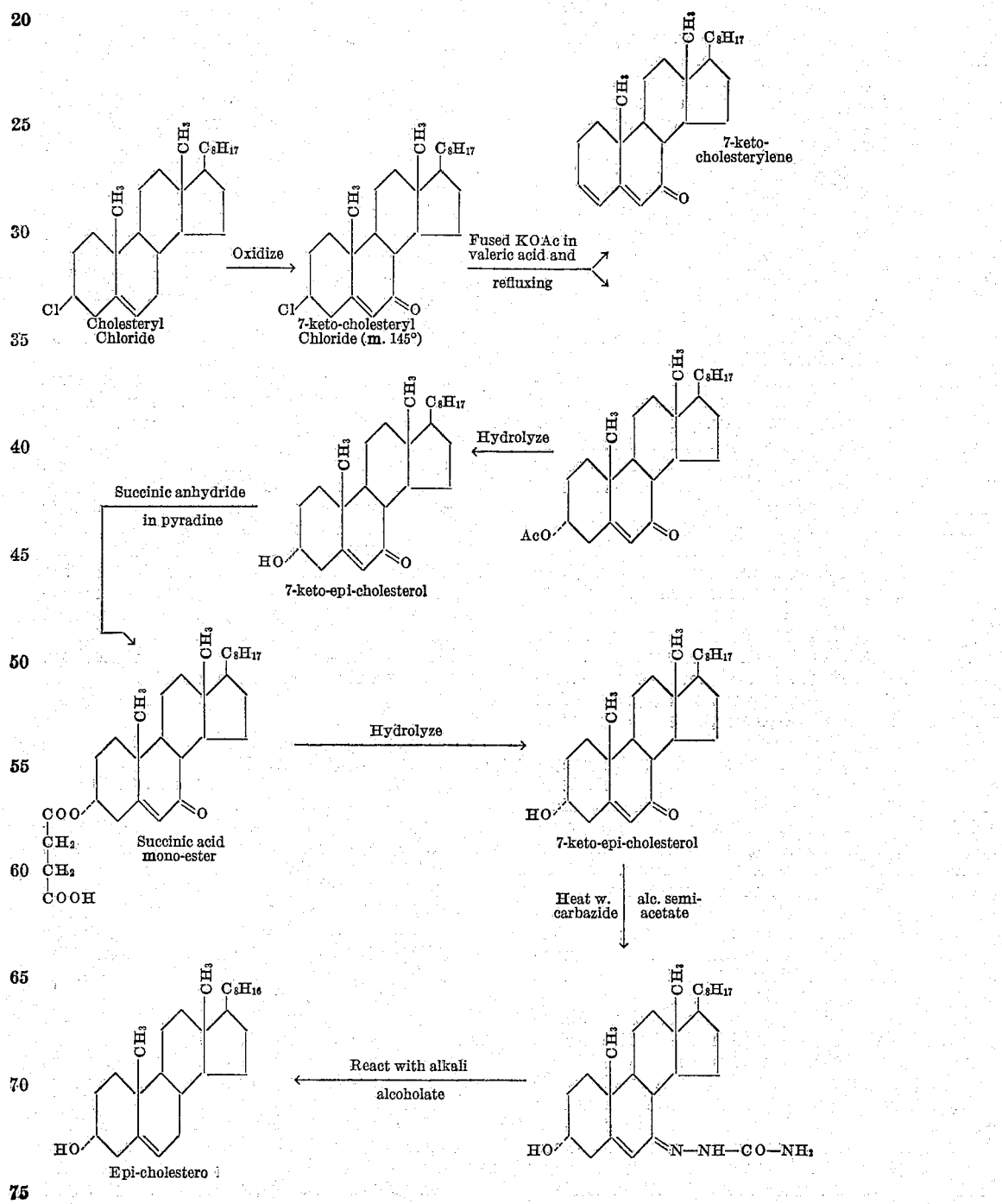

The above examples of experimental details are given for the purpose of illustrating the invention and are not intended to limit it thereto. Numerous variations from the conditions and materials of the examples given may obviously be employed, as long as they are included in the definition of the invention as given in the appended claims.

What I claim as my invention is:

1. The process for the preparation of epi-cholesterol which comprises oxidizing a cholesteryl halide to 7-keto cholesteryl halide with a strong oxidizing agent, converting the latter compound by hydrolysis into its corresponding 3-hydroxy compound with spatial inversion on the 3-carbon-atom, reacting the 7-keto epi-cholesterol thereby obtained with a hydrazine derivative, and decomposing and reducing the hydrazine derivative to epi-cholesterol.

2. The process for the preparation of epi-cholesterol which comprises oxidizing cholesteryl chloride with chromic acid to 7-keto cholesteryl chloride, reacting the 7-keto cholesteryl chloride with fused potassium acetate to obtain a mixture of 7-keto epi-cholesterol acetate and 7-keto cholesterylene, hydrolyzing the mixture to convert the 7-keto epi-cholesterol acetate into 7-keto epi-cholesterol, reacting the 7-keto epi-cholesterol with succinic anhydride to obtain the 7-keto cholesterylene mono-ester of succinic acid, separating the latter from 7-keto cholesterylene mixed therewith by dissolving it out of the mixture with alkaline aqueous solution, hydrolyzing the separated mono-ester compound to produce purified 7-keto epi-cholesterol, reacting the 7-keto epi-cholesterol with semicarbazide to produce the corresponding semicarbazone, and reacting the semicarbazone with alkali alcoholate to obtain epi-cholesterol.

3. In the process for the preparation of epi-cholesterol from a cholesteryl halide, the steps of purifying the crude 7-keto epi-cholesterol intermediate which comprises treating the crude 7-keto epi-cholesterol with an acylating agent derived from a dibasic organic acid to obtain the corresponding mono-ester acid, dissolving the mono-ester acid with aqueous alkaline solution from water-insoluble impurities, and hydrolyzing the separated mono-acid ester to purified 7-keto epi-cholesterol.

4. 7-keto-cholesteryl chloride.

5. A 7-keto cholesteryl halide.

6. In a process for the preparation of epi-cholesterol compounds, the step which comprises oxidizing a cholesteryl halide to a 7-keto cholesteryl halide with a strong oxidizing agent.

RUSSELL EARL MARKER.